United States Patent
Fujita et al.

(10) Patent No.: US 7,067,021 B2
(45) Date of Patent: Jun. 27, 2006

(54) METHOD OF MANUFACTURING MULTILAYER MATERIAL FOR PLAIN BEARING

(75) Inventors: Masahito Fujita, Aichi (JP); Eisaku Inoue, Aichi (JP); Takayuki Shibayama, Aichi (JP)

(73) Assignee: Daido Metal Company Ltd., Nagoya (JP)

( * ) Notice: Subject to any disclaimer, the term of this patent is extended or adjusted under 35 U.S.C. 154(b) by 176 days.

(21) Appl. No.: 10/436,145

(22) Filed: May 13, 2003

(65) Prior Publication Data

US 2003/0209297 A1      Nov. 13, 2003

(30) Foreign Application Priority Data

May 13, 2002    (JP) .............................. 2002-137106

(51) Int. Cl.
*C21D 9/40* (2006.01)
*C22F 3/00* (2006.01)

(52) U.S. Cl. ........................ 148/513; 148/525; 75/336; 419/8

(58) Field of Classification Search ................ 148/513, 148/525; 75/332, 336, 10.13; 419/8
See application file for complete search history.

(56) References Cited

U.S. PATENT DOCUMENTS

| 4,758,404 A | * | 7/1988 | Muto ............................ 419/3 |
| 5,837,960 A | * | 11/1998 | Lewis et al. ............ 219/121.63 |
| 6,843,866 B1 | * | 1/2005 | Brenner et al. ............. 148/525 |

* cited by examiner

*Primary Examiner*—George Wyszomierski
(74) *Attorney, Agent, or Firm*—Browdy and Neimark, PLLC

(57) ABSTRACT

A method of manufacturing a multilayer material including a back metal and a metal plate made from a metal differing from the back metal is disclosed. The method includes heating powder of the metal formed into the metal plate in a reducing atmosphere so that an oxide on a surface of the metal powder is deoxidized, and spreading the deoxidized metal powder onto the back metal and irradiating laser beam having an energy density of 10 to 100 $kW/cm^2$ onto the metal powder spread on the back metal so that the metal powder is partially heated to be melted, while the laser beam is moved relative to the spread metal powder, and quenching the melted part of the metal powder at an underside of the back metal so that the melted part is rapidly solidified, whereupon the multilayer material has a dendritic structure in which the metal plate extends substantially vertically from a surface of the back metal, and the dendritic structure has a crystal grain size equal to or smaller than 0.02 mm at a cut surface thereof parallel to a surface of the back metal and/or a dendritic arm spacing equal to or smaller than 0.02 mm at a cut surface thereof vertical to the surface of the back metal.

10 Claims, 6 Drawing Sheets

FIG.2

| No | Alloy composition by wt.% | Manufacturing method | DAS by mm | Crystal grain size by mm | Grain diameter of pb by mm | Seizure load by Mpa | Fatigue specific pressure by Mpa |
|---|---|---|---|---|---|---|---|
| 1 | Cu-10Sn | ① | 0.054 | 0.040 | - | 35 | 90 |
| 2 | Cu-10Sn | ② | 0.060 | 0.055 | - | 35 | 120 |
| 3 | Cu-10Sn | ③ | 0.018 | 0.015 | - | 40 | 150 |
| 4 | Cu-10Sn-0.2P | ① | 0.048 | 0.040 | - | 40 | 110 |
| 5 | Cu-10Sn-0.2P | ② | 0.055 | 0.055 | - | 50 | 130 |
| 6 | Cu-10Sn-0.2P | ③ | 0.017 | 0.015 | - | 70 | 150 |
| 7 | Cu-10Sn-10Pb | ① | 0.043 | 0.038 | 0.055 | 90 | 100 |
| 8 | Cu-10Sn-10Pb | ② | 0.050 | 0.042 | 0.040 | 95 | 120 |
| 9 | Cu-10Sn-10Pb | ③ | 0.015 | 0.010 | 0.008 | 105 | 140 |
| 10 | Cu-3Sn-23Pb | ① | 0.048 | 0.045 | 0.045 | 110 | 85 |
| 11 | Cu-3Sn-23Pb | ② | 0.062 | 0.050 | 0.060 | 110 | 110 |
| 12 | Cu-3Sn-23Pb | ③ | 0.018 | 0.015 | 0.012 | 135 | 125 |
| 13 | Cu-11Sn-5Pb-3Ni | ① | 0.045 | 0.053 | 0.031 | 85 | 110 |
| 14 | Cu-11Sn-5Pb-3Ni | ② | 0.050 | 0.046 | 0.046 | 85 | 130 |
| 15 | Cu-11Sn-5Pb-3Ni | ③ | 0.019 | 0.016 | 0.015 | 95 | 150 |
| 16 | Cu-20Zn-7Pb-3Mn-1Si | ① | 0.057 | 0.055 | 0.029 | 100 | 120 |
| 17 | Cu-20Zn-7Pb-3Mn-1Si | ② | 0.055 | 0.061 | 0.040 | 120 | 150 |
| 18 | Cu-20Zn-7Pb-3Mn-1Si | ③ | 0.012 | 0.017 | 0.011 | 135 | 170 |
| 19 | Cu-10Sn-10Bi | ① | 0.046 | 0.035 | 0.050 | 80 | 100 |
| 20 | Cu-10Sn-10Bi | ② | 0.040 | 0.042 | 0.045 | 85 | 120 |
| 21 | Cu-10Sn-10Bi | ③ | 0.008 | 0.010 | 0.009 | 100 | 140 |

Crystal grain size

FIG.4A
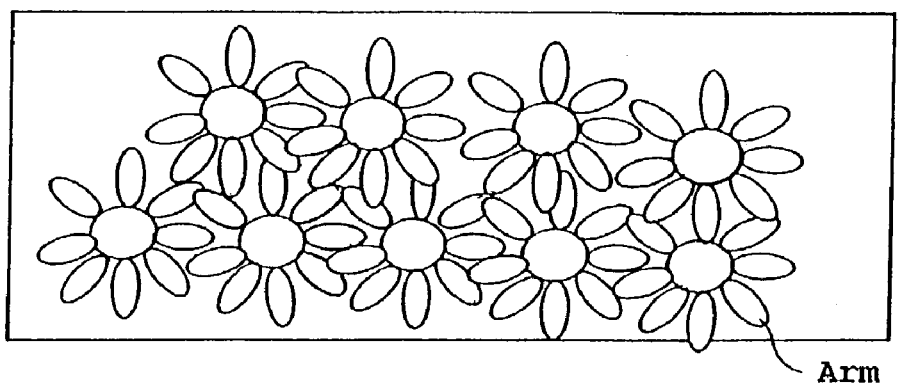
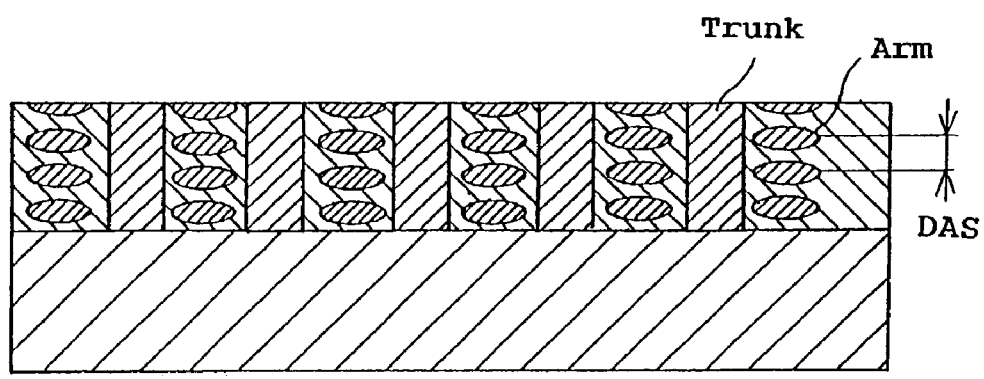
FIG.4B

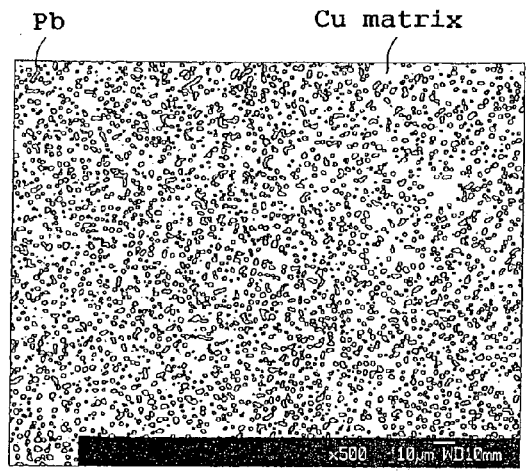
FIG.5A  FIG.5B
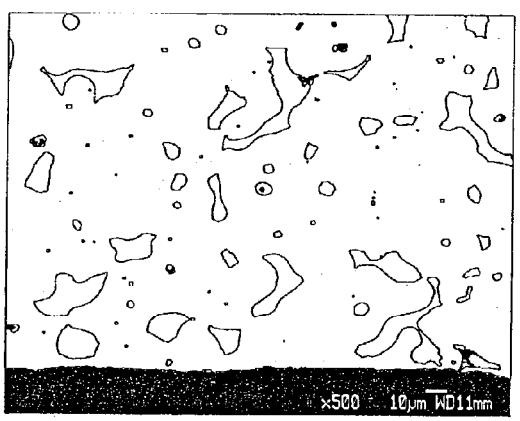
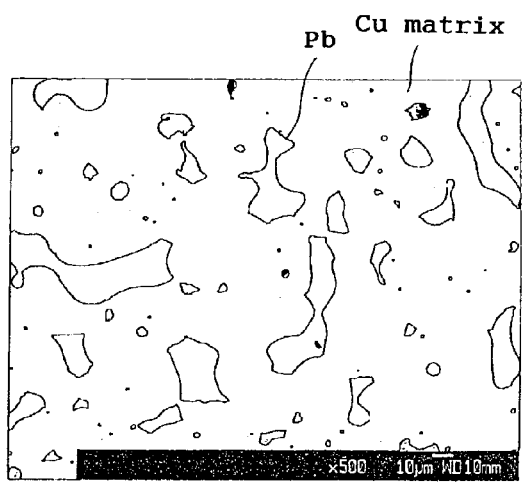
FIG.6A  FIG.6B
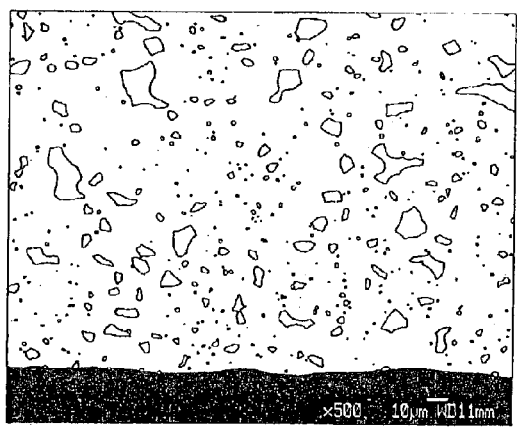
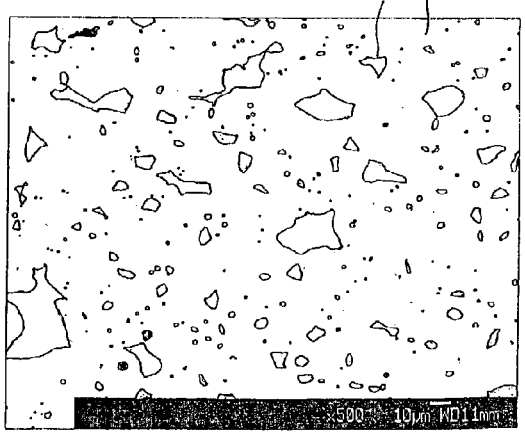
FIG.7A  FIG.7B

METHOD OF MANUFACTURING MULTILAYER MATERIAL FOR PLAIN BEARING

BACKGROUND OF THE INVENTION

1. Field of the Invention

This invention relates generally to a method of manufacturing a multilayer material used for production of plain bearings or the like, and more particularly to such a method of manufacturing the multilayer material including a metal plate which is bonded to a back metal and has a directional dendritic structure.

2. Description of the Related Art

A method of manufacturing a multilayer material for bearings in which a copper bearing alloy (bearing alloy layer) is bonded to a back metal such as steel plate includes a sintering method and a continuous casting method. In the sintering method, sintered powder of copper alloy composing the copper bearing alloy is distributed over the steel plate so as to have a predetermined thickness. Subsequently, the steel plate is heated at 850° C. to 900° C. in a reducing atmosphere ("primary sintering"). The steel plate is then rolled so that the density of a copper alloy powder layer becomes 100%. Finally, a second sintering is carried out under the same condition as the primary sintering, whereupon a multilayer material is completed.

In the continuous casting, both ends of a steel plate are bent into a generally L-shape so that the plate is formed into the shape of a channel. Subsequently, the channel-shaped steel plate is preheated up to 1000° C. in a reducing atmosphere, and molten copper alloy is poured into the channel-shaped steel plate. Oil quenching is carried out at the underside of the steel plate so that the molten copper alloy poured is cooled from a lower part thereof, whereby solidification progresses upward. The L-shaped portions of the steel plate are then cut off, and an unnecessary portion of the copper alloy surface is also cut off. Subsequently, the martensitic steel plate is heated until 800° C. to be softened, whereupon the multilayer material is completed.

The above-described sintering method necessitates equipment both for the primary and secondary sintering and rolling equipment. The continuous casting method requires equipment for forming the steel plate into the channel-shape, preheating equipment and casting equipment. Accordingly, each method requires an extremely long production line.

Furthermore, in the case of the sintering method, holes tend to remain in the structure of the copper alloy layer. Thus, an insufficient densification in the structure of the copper alloy layer results in a problem of low fatigue resistance. Furthermore, a bonding strength is low between the copper alloy layer and the steel plate and further, heating in the secondary sintering coarsens the structure of the copper alloy layer and reduces the strength of the layer. On the other hand, in the case of the continuous casting method, the bonding strength is high between the copper alloy layer and the steel plate. However, the steel plate is hardened when the oil quenching is carried out at the underside of the steel plate so that the molten copper alloy poured is solidified. Annealing is accordingly required afterwards so that the hardened steel is softened. The annealing coarsens the structure of the copper alloy layer and reduces the strength of the layer.

SUMMARY OF THE INVENTION

Therefore, an object of the present invention is to provide a method of manufacturing a multilayer material which has a fine structure and a high strength.

A multilayer material to be manufactured by the present invention includes a back metal and a metal plate made from a metal differing from the back metal. The metal plate has a dendritic structure in which the metal plate extends substantially vertically from a surface of the back metal, and the dendritic structure has a crystal grain size equal to or smaller than 0.02 mm at a cut surface thereof parallel to the surface of the back metal and/or a dendritic arm spacing equal to or smaller than 0.02 mm at a cut surface thereof vertical to the surface of the back metal.

In order that the above-described multilayer material may be manufactured, the present invention provides a method comprising heating powder of the metal formed into the metal plate in a reducing atmosphere so that oxide on a surface of the metal powder is deoxidized and so that a hydrogen loss becomes not more than 0.05% and spreading the deoxidized metal powder onto the back metal and irradiating laser beam having an energy density of 10 to 100 kW/cm$^2$ onto the metal powder spread on the back metal so that the metal powder is partially heated to be melted, while the laser beam is moved relative to the spread metal powder, and quenching the melted part of the metal powder at an underside of the back metal so that the melted part is rapidly solidified.

Laser beam is suitable for a partial or local heating. The metal plate can sufficiently be bonded to the back metal when the metal powder is partially heated to be melted. Moreover, the local heating has only a small thermal effect on the other part. Additionally, since a heated part is localized, a quenching operation for the heated part can easily be performed. A semiconductor laser having a high energy conversion efficiency is preferably used as a beam source.

In the invention, an energy density of the laser beam providing suitable melting and solidifying conditions is determined to range from 10 to 100 kW/cm$^2$. The metal powder spread on the back metal is not melted when the energy density is below 10 kW/cm$^2$. The back metal is melted when the energy density exceeds 100 kW/cm$^2$. In each case, the back metal and bearing alloy layer (metal plate) cannot be rendered bimetallic. Accordingly, the back metal and bearing alloy layer can be maintained in a suitable bonded state and rendered bimetallic when the energy density ranges from 10 to 100 kW/cm$^2$.

In the above-described method, part of the metal powder subjected to laser beam absorbs the laser beam to be melted instantaneously, and the molten metal is rendered spherical, when the laser beam is irradiated onto the metal powder spread on the back metal. In this case, a heating rate of the laser beam is at or above 800° C./sec. Gravity causes the spherical part of molten metal to extend over the back metal at a next moment. The extended molten metal is quenched at an underside of the back metal. Consequently, solidification of the molten metal progresses vertically upward from a surface of the back metal.

The multilayer material of the invention is thus manufactured by the above-described method. The bearing alloy layer has a dendritic structure in which the bearing alloy layer extends substantially vertically from the surface of the back metal. The dendritic structure has a crystal grain size equal to or smaller than 0.02 mm at a cut surface thereof parallel to a surface of the back metal and/or a dendritic arm spacing equal to or smaller than 0.02 mm at a cut surface thereof vertical to the surface of the back metal.

In the invention, oxides on the surface of the metal powder are deoxidized before the laser beam is irradiated onto the metal powder. The reason for this will now be described. The inventors have employed a laser method in order to obtain a multilayer material with a fine structure and a high strength. In the laser method, metal powder is locally heated by the laser beam to be melted after the metal powder has been spread on the back metal. The melted part of the metal powder is quenched at the underside of the back metal to be rapidly solidified. However, a multilayer material manufactured by the laser method contains a large number of holes and a large amount of inclusion such as oxides or carbide in the structure of the bearing alloy layer as shown in FIG. 9. As a result, the structure of the obtained multilayer material has a low degree of densification. The inventors conducted experiments in order to find a cause for the presence of the holes or inclusion in the bearing alloy layer. The inventors found that oxides formed on the surface of the metal powder resulted in the holes or inclusion.

More specifically, the surface of the metal powder is exposed to air to be oxidized such that oxides are formed on the surface of the metal powder. When laser beam is irradiated onto the oxides on the surface of the metal powder, the oxides are ionized to emit gases such that plasma flames are produced, whereupon the laser beam is attenuated before reaching the metal powder. Consequently, the thermal lens effect takes place in which the laser beam cannot provide original energy and accordingly, a stable melting state cannot be maintained. This results in holes or inclusion in the bearing alloy layer.

When the metal powder is taken as an object onto which laser beam is to be irradiated, oxides on the metal powder surface has a large effect since the metal powder has an extremely large specific surface area. Moreover, a degree of oxidation is non-uniform depending upon a powder grain size. Accordingly, when laser beam is irradiated onto the metal powder, oxidation of the metal powder needs to be maintained at a predetermined stable level in order that laser beam may stably be irradiated and light energy may stably be supplied.

TABLE 1 shows a degree of oxidation on the surface of metal powder and occurrence of plasma in the case where laser beam is irradiated onto the metal powder. The shown values were obtained by experiment, and the oxidation degree is shown as hydrogen loss standardized in JPMA P 03-1992 defined by the Japan Powder Metallurgy Association.

TABLE 1

| Powder | Hydrogen loss (%) | Production of plasma |
|---|---|---|
| Cu-10Sn-10Pb | 0.30 | Yes |
| Cu-10Sn-10Pb | 0.20 | Yes |
| Cu-10Sn-10Pb | 0.10 | Yes |
| Cu-10Sn-10Pb | 0.05 | No |
| Cu-2Sn-23Pb | 0.30 | Yes |
| Cu-2Sn-23Pb | 0.20 | Yes |
| Cu-2Sn-23Pb | 0.10 | Yes |
| Cu-2Sn-23Pb | 0.05 | No |
| Cu-10Sn | 0.30 | Yes |
| Cu-10Sn | 0.20 | Yes |
| Cu-10Sn | 0.10 | Yes |
| Cu-10Sn | 0.05 | No |

As obvious form TABLE 1, plasma is always produced when the metal powder is so oxidized as to have a high hydrogen loss. Accordingly, it is understood that a copper alloy powder effective for the laser method has such a clear surface as to have a hydrogen loss not more than 0.05%. FIG. 8 shows a structure of the bearing alloy layer (copper alloy powder melted by laser beam subsequently to deoxidization). In this case, copper alloy powder (Cu-10Sn-10Pb) has a hydrogen loss of 0.03%. The shown structure has no holes and no inclusion.

Metal powder may be deoxidized before and after spread onto the back metal. When metal powder is deoxidized after having been spread onto the back metal, laser beam can be irradiated onto the metal power immediately after deoxidization. Consequently, oxides can be prevented from being reproduced.

In the above-described method, the metal powder is sprinkled on the back metal and melted by laser beam. Thereafter, the melted metal powder is quenched, whereby a bimetal is produced. This method requires no equipment both for the primary and secondary sintering and rolling equipment all of which equipment the conventional sintering method requires. Furthermore, this method requires no large-scaled equipment for melting a metal nor large-scaled cooling system for cooling a large amount of molten metal poured on the steel plate as in the conventional continuous casting method. Consequently, the production line for the multilayer material can be shortened. Moreover, part of the metal powder on the back metal is rapidly melted and cooled such that the structure of the bearing alloy layer can be fine.

A copper alloy is one of materials having finest characteristics and has a good wettability and a high bonding performance with respect to the steel back metal. However, the copper alloy is inferior in light absorption. In view of these characteristics of the copper alloy, a semiconductor laser is preferred. Laser beam generated by the semiconductor laser has a wavelength ranging from 0.8 to 1.1 µm. Since the wavelength exhibits a high light absorption rate for copper alloy, the method of the present invention can desirably be carried out when the copper alloy and the semiconductor laser are combined together.

A branch can be confirmed extending from a portion of the dendritic structure corresponding to a trunk in the bearing alloy layer in one multilayer material manufactured by the method of the invention. However, such a branch cannot be confirmed in another material manufactured by the method of the invention. The branch will be referred to as "arm." For example, when a melted and solidified copper alloy contains lead, bismuth or tin, lead particles, bismuth particles or tin particles are interposed between the arms extending from the trunk. Thus, arms can be confirmed. On the other hand, when a heat treatment such as annealing is carried out for the purpose of refining, tin disappears between the arms by the heat treatment although lead or bismuth remains between the arms. As a result, the arms cannot be confirmed in the case of tin.

In view the circumstances, when arms of the dendritic structure cannot be confirmed, a grain diameter L of the dendritic structure on a cut plane parallel to the surface of the back metal is referred to as crystal grain size in the unit of mm, as shown in FIGS. 3A and 3B. When arms of the dendritic structure can be confirmed, a spacing between the arms of the dendritic structure is referred to as dendritic arm spacing DAS in the unit of mm. Measurement of crystal grain size is conformed to JIS-H-0501.

The multilayer material manufactured by the method of the present invention includes a metal plate having a dendritic structure extending approximately perpendicularly to the surface of the back metal. As a result, when a plain bearing is made of the multilayer material manufactured by the method of the invention, the trunk of the dendritic structure corresponds with a load direction of a counter material and accordingly, the trunk serves as a column supporting the load. Consequently, the strength and fatigue resistance of the plain bearing can be improved.

Furthermore, the dendritic structure of the metal plate has a crystal grain size equal to or smaller than 0.02 mm at a cut surface thereof parallel to a surface of the back metal and/or a dendritic arm spacing equal to or smaller than 0.02 mm at a cut surface thereof vertical to the surface of the back metal. Consequently, when a sliding bearing is manufactured of the multilayer material, the anti-seizure property and fatigue resistance of the plain bearing can be improved.

FIGS. 5A and 5B show a solidified structure of the copper alloy in the case of the multilayer material manufactured by the method of the invention. FIGS. 6A and 6B show a solidified structure of the copper alloy in the case of a multilayer material manufactured by the conventional sintering method. FIGS. 7A and 7B show a solidified structure of the copper alloy in the case of a multilayer material manufactured by the conventional continuous casting method. In each case, the copper alloy comprises, by mass, 10% Sn, 10% Pb and the remainder of Cu. As obvious from the comparison of FIGS. 5A and 5B with FIGS. 6A and 6B, and FIGS. 7A and 7B, it is understood that the multilayer material of the present invention has a finer structure of the metal plate than those shown in FIGS. 6A and 6B and 7A and 7B. Each of FIGS. 5A, 6A and 7A shows the structure on the cut surface perpendicular to the surface of the back metal. Each of FIGS. 5B, 6B and 7B shows the structure on the cut surface parallel to the surface of the back metal. Each of FIGS. 5A–7B illustrates a copper matrix and grains of Pb on the matrix.

The anti-seizure property and fatigue resistance of the plain bearing cannot be improved when the crystal grain size of the dendritic structure and the dendritic arm spacing each exceed 0.02 mm. When the cooling rate of the metal melted by the laser beam is set at or above 100° C./sec, each of the crystal grain size of the dendritic structure and the dendritic arm spacing can reliably be equal to or smaller than 0.02 mm.

In the present invention, when the laser beam is moved relative to the fixed back metal with the metal powder sprinkled thereon or when the back metal with the metal powder spread thereof is moved relative to the fixed laser beam, a moving speed is important for the manufacture of the multilayer material in each case. When the moving speed is lower than 0.2 m/min., the metal powder is subjected to an excessive amount of energy of the laser beam such that the back metal is melted. On the other hand, when the moving speed exceeds 5 m/min., the metal powder is not melted such that the back metal and bearing alloy layer cannot be rendered bimetallic.

The moving speed, a heating rate and cooling rate of the metal powder affect the depth of a heat-affected zone of the back metal. In the conventional continuous casting method, the quenching at the opposite side of the steel plate renders the steel plate martensitic, whereupon subsequent treatment cannot be carried out. Accordingly, the steel plate needs to be heat-treated at high temperatures after the casting. In the invention, however, the moving speed of the metal plate relative to the laser beam and the heating and cooling rates of the metal powder are set at respective suitable values so that the depth of the heat-affected zone of the back metal is set at or below 0.3 mm.

When the back metal has the heat-affected zone whose depth is set at or below 0.3 mm, heat does not affect the overall back metal, whereby tempering at high temperatures need not be carried out. However, a heat treatment for refining should not be negatived. Furthermore, the back metal has a double-layer structure including the heat-affected zone and the original structure. Accordingly, since the back metal produces effects of a composite material, the back metal is effective in improvement of the strength thereof. The heat-affected zone of the back metal is a zone which is quickly heated and cooled and in which the crystal grain size has been refined.

It is desirable that a homogenizing process should be carried out for the multilayer material manufactured as described above. More specifically, in order that segregation of components or distortion of the material may be eliminated by the quick cooling during melting and solidification, an annealing process can be carried out at a temperature ranging from 400 to 800° C. for one to ten hours, depending upon a purpose and components of the material. In this case, however, an annealing temperature should not be set at such a value that would change the basic structure of the multilayer material which has been endowed with directivity and solidified. Particularly when the annealing temperature exceeds 600° C., discretion is required so that the crystal grain size is not coarsened or otherwise, the material strength would be reduced.

BRIEF DESCRIPTION OF THE DRAWINGS

Other objects, features and advantages of the present invention will become clear upon reviewing the following description of a preferred embodiment, made with reference to the accompanying drawings, in which:

FIG. 2 shows the results of experiments conducted for the multilayer materials made by the method of the invention, continuous casting method and sintering method respectively;

FIGS. 4A and 4B show a dendritic arm spacing;

FIGS. 5A and 5B show a structure of the copper alloy in the multilayer material manufactured by the method of the invention;

FIGS. 6A and 6B show a structure of the copper alloy in the multilayer material manufactured by the sintering method;

FIGS. 7A and 7B show a structure of the copper alloy in the multilayer material manufactured by the continuous casting method;

DETAILED DESCRIPTION OF THE INVENTION

Figure 1:
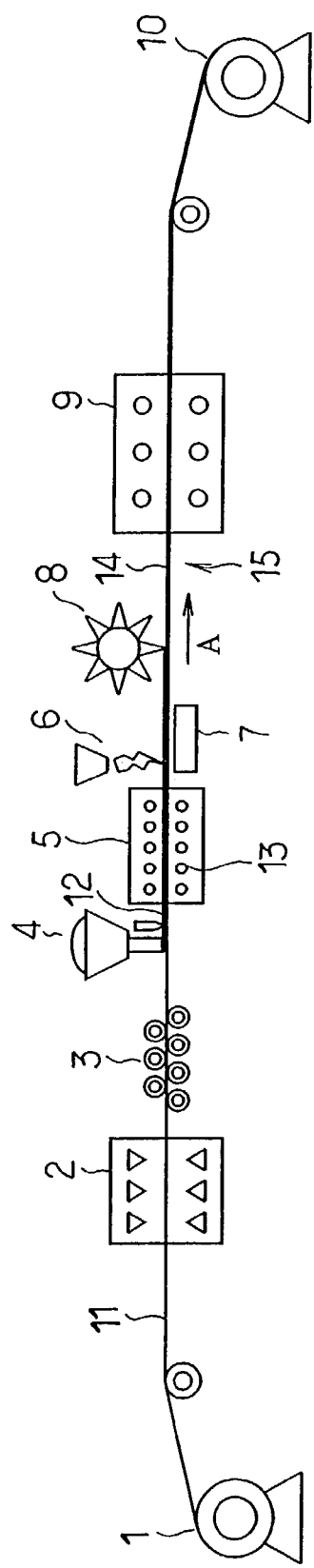
FIG. 1 is a schematic view of manufacturing equipment in accordance with one embodiment of the present invention.
Figure 3A:
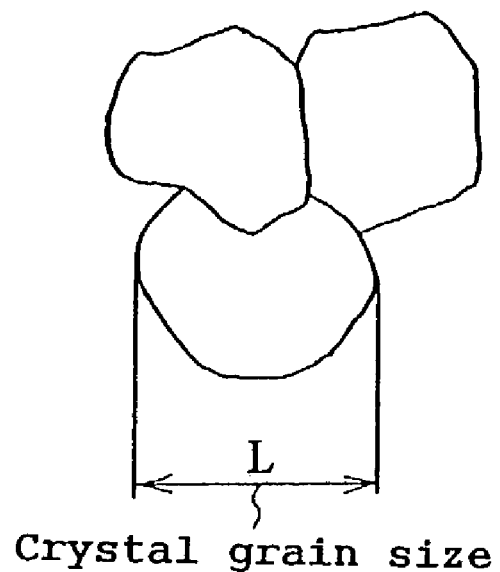
FIGS. 3A and 3B show a crystal grain size.
Figure 3B:
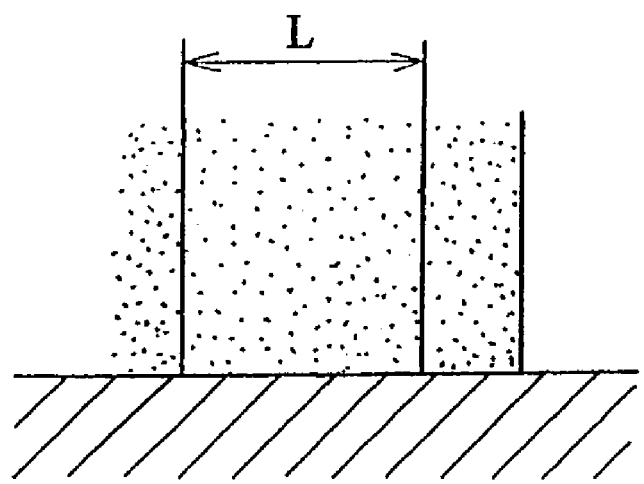
Figure 8:
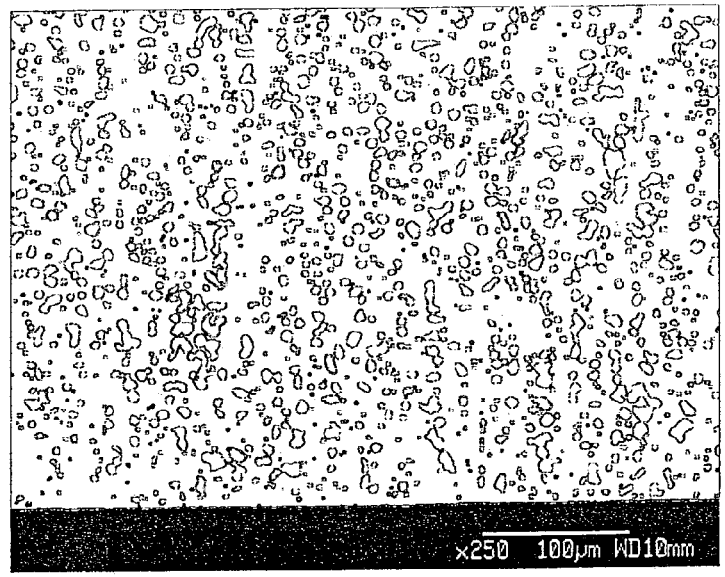
FIG. 8 shows a structure of alloy (copper alloy powder melted by laser beam subsequently to deoxidization)
Figure 9:
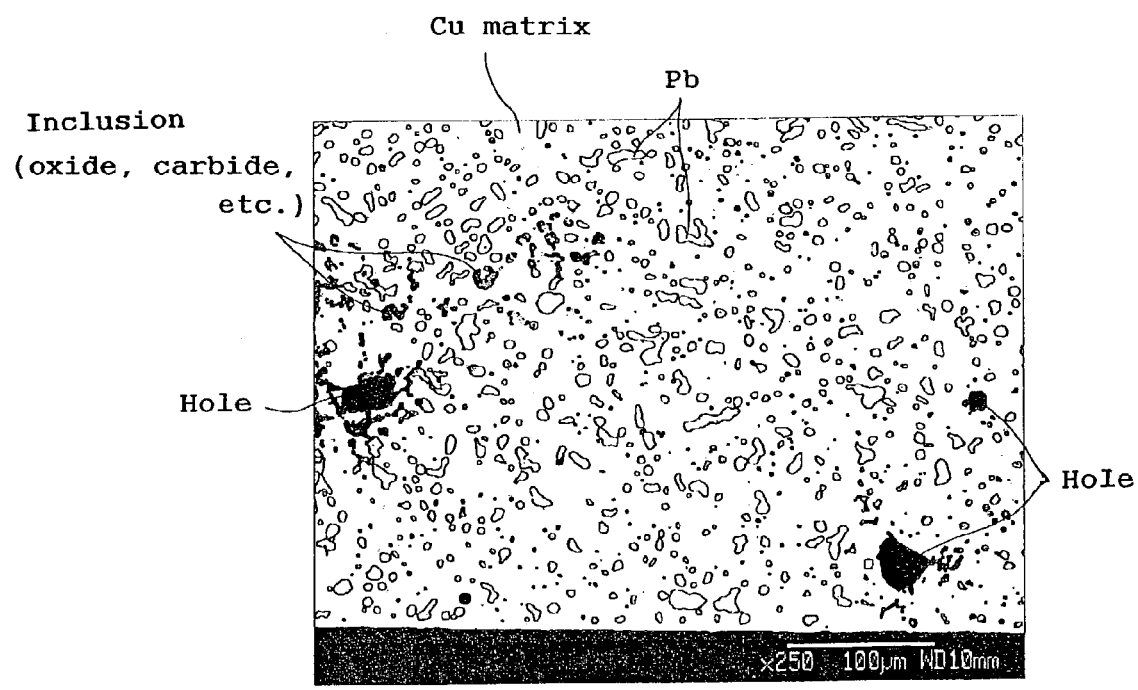
FIG. 9 shows a structure of alloy (copper alloy powder melted by laser beam without subsequent deoxidization).

One embodiment of the present invention will be described with reference to the accompanying drawings. The invention is applied to a multilayer material for a bearing which is composed by bonding a copper bearing alloy to a steel plate. Referring to FIG. 1, manufacturing equipment for the multilayer material is schematically shown. The equipment includes an uncoiler 1, cleaning apparatus 2, leveler 3, powder spreader 4, deoxidizing furnace 5, laser apparatus 6, cooling apparatus 7, milling 8, annealing furnace 9 and coiler 10 arranged in this sequence.

The uncoiler 1 uncoils a coiled band steel 11 serving as a back metal. The band steel 11 drawn out of the uncoiler 1 is cleaned by the cleaning apparatus 2 and thereafter, curl of the band steel 11 is cured by the leveler 3. The powder spreader 4 is provided for spreading a copper alloy powder 12 onto the band steel 11. Laser beams are irradiated onto the copper alloy powder 12 spread on the band steel 11 by the laser apparatus 6 after oxides on the band steel 11 have been deoxidized by the deoxidizing furnace 5.

The deoxidizing furnace 5 comprises an electric heater 13 provided therein and including, for example, a heating wire. A reducing gas such as $H_2$ or CO is supplied into the furnace 5 in the deoxidation. The laser apparatus 6 includes a plurality of semiconductor lasers integrated. The laser beam is irradiated from the laser apparatus 6 into a slender rectangular shape extending over the width of the band steel 11. A shielding gas such as Ar is injected around the rectangular laser beam. The rectangular laser beam is irradiated onto the copper alloy powder so that each longer side of the rectangular laser beam is perpendicular to a feeding direction in which the band steel 11 is fed, as shown by arrow A in FIG. 1. Accordingly, a widthwise linear region of the copper alloy powder 12 with respect to the band steel 11 is subjected to the laser beam.

The cooling apparatus 7 is disposed below the laser apparatus 6 with the band steel 11 extending therebetween. The cooling apparatus 7 is of the water injection type and injects water toward the lower side or underside of the band steel 11 to cool the metal melted by the laser beam on the opposite side of the band steel.

After the melted copper alloy powder 12 has been solidified to be formed into a copper alloy layer 14 serving as a surface layer, the milling 8 cuts the surface side of the copper alloy layer 14 to obtain a uniform thickness of the layer. The annealing furnace 9 performs an annealing operation after the milling so that the copper alloy layer 14 is homogenized. The annealed multilayer material 15 is then wound into the shape of a coil by the coiler 10.

The operation of the foregoing manufacturing equipment will now be described. The band steel 11 rewound from the uncoiler 1 is cleaned by the cleaning apparatus 2. After the curl of the band steel 11 has been cured by the leveler 3, the band steel is then fed to the powder spreader 4 in order that the copper alloy powder may be spread onto the upper face of the band steel 11 (spreading step). The band steel 11 is then carried into the reducing furnace 5 in which heat is applied to the copper alloy powder by the heater 13 in a reducing atmosphere so that the oxides on the surface of the band steel 11 are deoxidized (deoxidizing step). A hydrogen loss of the surface oxide is reduced to a value not more than 0.05% as the result of deoxidation. It is preferable that the temperature of the reducing atmosphere should range from 400 to 900° C.

Thereafter, the laser beam is irradiated by the laser apparatus 6 onto the copper alloy powder 12 so that the powder 12 is quickly melted. Upon melt of the copper alloy powder 12, the band steel 11 is quickly cooled by the cooling apparatus 7 disposed at the back side thereof, so as to be quickly cooled thereby to be quickly solidified (melting and cooling step). In this case, since a hydrogen loss of the surface oxide is reduced to a value not more than 0.05%, plasma flames are prevented from being produced due to the irradiation of laser beam and consequently, the copper alloy powder is desirably melted. Since the subsequent solidification progresses from the lower side of the copper alloy to the upper side thereof, the dendritic structure extends substantially vertically from the surface of the band steel 11, and each of the crystal grain size and dendritic arm spacing are controlled so as to take a value not more than 0.02 mm.

Thus, the copper alloy powder 12 is melted and then solidified such that the copper alloy layer 14 is joined with the band steel 11, whereby the multilayer material 15 is formed. Subsequently, an unnecessary part of the surface of the layer 14 is cut by the milling 8 to be eliminated. The multilayer material 15 is then annealed at 600° C. and is coiled by the coiler 10 thereafter.

The laser apparatus 6 used in the foregoing manufacture of the multilayer material irradiates the laser beam having a wavelength of 0.8 μm, has output of 4 kW and energy density of 66.8 kW/cm². The band steel 11 is moved at the speed of 1 m/min. The used band steel 11 has a thickness of 2 mm, and the copper alloy powder 12 has a globular form and an average grain diameter of 100 μm. The powder 12 has a thickness of 1 mm when spread on the band steel 11.

TABLE 2 shows the results of comparison among the conventional sintering method, continuous casting method and the embodiment of the invention regarding the length of the production line and a production time of the multilayer material per predetermined length thereof.

TABLE 2

| Production method | Length of overall production line (m) | Predetermined Production time (min/m) |
| --- | --- | --- |
| Sintering | 70 | 35 |
| Continuous casting | 90 | 23 |
| Present invention | 15 | 15 |

From TABLE 2, it is understood that the production line in the method of the present invention is shorter and superior in the production efficiency than those in the conventional methods.

TABLE 3 shows the results of an alloy strength test and a shearing strength test both conducted with respect to a product produced by the method of the present invention and products made by the conventional sintering and continuous casting methods respectively. In the alloy strength test, a part of the multilayer material was cut from the band steel so that a test piece including only a copper alloy part was made, and a tensile strength test was conducted using the test piece. In the shearing strength test, a test piece made was formed with a slit extending at the copper alloy side to the boundary between the copper alloy and the steel plate and a slit extending at the steel side to the boundary, with a distance of 5 mm between the slits, so that the shearing strength or adhesive strength was tested between the copper alloy layer and the steel plate.

TABLE 3

| Production method | Alloy strength by N/mm² | Shearing strength by N/mm² |
| --- | --- | --- |
| Sintering | 235 | 199 |
| Continuous casting | 270 | 255 |
| Present invention | 285 | 274 |

From TABLE 3, it is understood that both of alloy strength and shearing strength are higher in the present invention than those in the conventional methods.

The dendritic arm spacing (DAS), crystal grain size and grain diameter of Pb were measured regarding a multilayer material of the embodiment made by the method of the present invention, a first comparison made by the conventional sintering method, and a second comparison made by the conventional continuous casting method. FIG. 2 shows the composition of the copper alloy used in each multilayer material. In FIG. 2, encircled numerals ①, ② and ③ in the column of production method designate the conventional sintering method, continuous casting method and the method of the present invention respectively. Furthermore, half bearings were made of these multilayer materials respectively, and a seizure test and a fatigue test were conducted regarding the half bearings. TABLES 4 and 5 show the results of the seizure and fatigue tests respectively. Regarding the method of the present invention, DAS, crystal grain size and grain diameter of Pb were measured before annealing.

TABLE 4

| Seizure test | |
| --- | --- |
| Testing machine | Static load seizure testing machine |
| Number of revolution | 2000 rpm |
| Test time | For each load, 10 minutes, 5 MPa, step-up system |
| Peripheral speed | 4.2 m/sec |
| Lubricating temperature | 100° C. |
| Amount of lubricant | 20 cc/min |
| Lubricant | #20 straight motor oil |
| Oil clearance | 0.04 to 0.06 mm |
| Determination of seizure | Occurrence of seizure is determined when the temperature of bearing rear has exceeded 200° C. or motor has been overloaded. |

TABLE 5

| Fatigue test | |
| --- | --- |
| Testing machine | Dynamic load fatigue testing machine |
| Number of revolution | 3300 rpm |
| Test time | 20 hours |
| Peripheral speed | 9.0 m/sec |
| Lubricating temperature | 120° C. |
| Lubricating pressure | 0.3 MPa |
| Lubricant | #20 straight motor oil |
| Oil clearance | 0.04 to 0.06 mm |
| Determination of fatigue | Specific load at the time when 5% or more of bearing area has broken due to fatigue is referred to as specific load of fatigue occurrence. |

As obvious from FIG. 2, the multilayer material made by the method of the present invention has a fine crystal and a fine grain diameter of Pb and accordingly, is superior in the anti-seizure property and fatigue resistance.

In modified forms, the front and back metals should not be limited to the copper alloy and the steel respectively. Annealing may be or may not be carried out. Additionally, the dendritic structure has a crystal grain size equal to or smaller than 0.02 mm at a cut surface thereof parallel to a surface of the back metal and/or a dendritic arm spacing equal to or smaller than 0.02 mm at a cut surface thereof vertical to the surface of the back metal, as described above.

However, the foregoing dendritic structure is present before annealing is performed. Both of the crystal grain size and dendritic arm spacing change after annealing.

The foregoing description and drawings are merely illustrative of the principles of the present invention and are not to be construed in a limiting sense. Various changes and modification will become apparent to those of ordinary skill in the art. All such changes and modifications are seen to fall within the scope of the present invention as defined by the appended claims.

We claim:

1. A method of manufacturing a multilayer material including a back metal and a metal plate made from a metal differing from the back metal, the method comprising:

heating powder of the metal formed into the metal plate in a reducing atmosphere so that oxide on a surface of the metal powder is deoxidized and so that a hydrogen loss becomes not more than 0.05%; and spreading the deoxidized metal powder onto the back metal and irradiating laser beam having an energy density of 10 to 100 kW/cm$^2$ onto the metal powder spread on the back metal so that the metal powder is partially heated to be melted, while the laser beam is moved relative to the spread metal powder, and quenching the melted part of the metal powder by water supplied toward an underside of the back metal so that the melted part is rapidly solidified at a cooling rate set at or above 100° C./sec, whereupon the multilayer material has a dendritic structure in which the metal plate extends substantially vertically from a surface of the back metal, and the dendritic structure has a crystal grain size equal to or smaller than 0.02 mm at a cut surface thereof parallel to a surface of the back metal and/or dendritic arm spacing equal to or smaller than 0.02 mm at a cut surface thereof vertical to the surface of the back metal.

2. A method according to claim 1, wherein the deoxidizing is carried out subsequently to the spreading.

3. A method according to claim 2, wherein the laser beam is moved at 0.2 to 5.0 m/min relative to the metal powder.

4. A method according to claim 2, wherein the metal powder is heated at or above 800° C./sec by the laser beam.

5. A method according to claim 2, wherein the laser beam is emitted from a semiconductor laser.

6. A method according to claim 2, further comprising homogenizing the metal plate by annealing subsequently to the melting and solidifying the metal powder.

7. A method according to claim 1, wherein the laser beam is moved at 0.2 to 5.0 m/min relative to the metal powder.

8. A method according to claim 1, wherein the metal powder is heated at or above 800° C./sec by the laser beam.

9. A method according to claim 1, wherein the laser beam is emitted from a semiconductor laser.

10. A method according to claim 1, further comprising homogenizing the metal plate by annealing subsequently to the melting and solidifying the metal powder.

* * * * *